Patented Oct. 21, 1924.

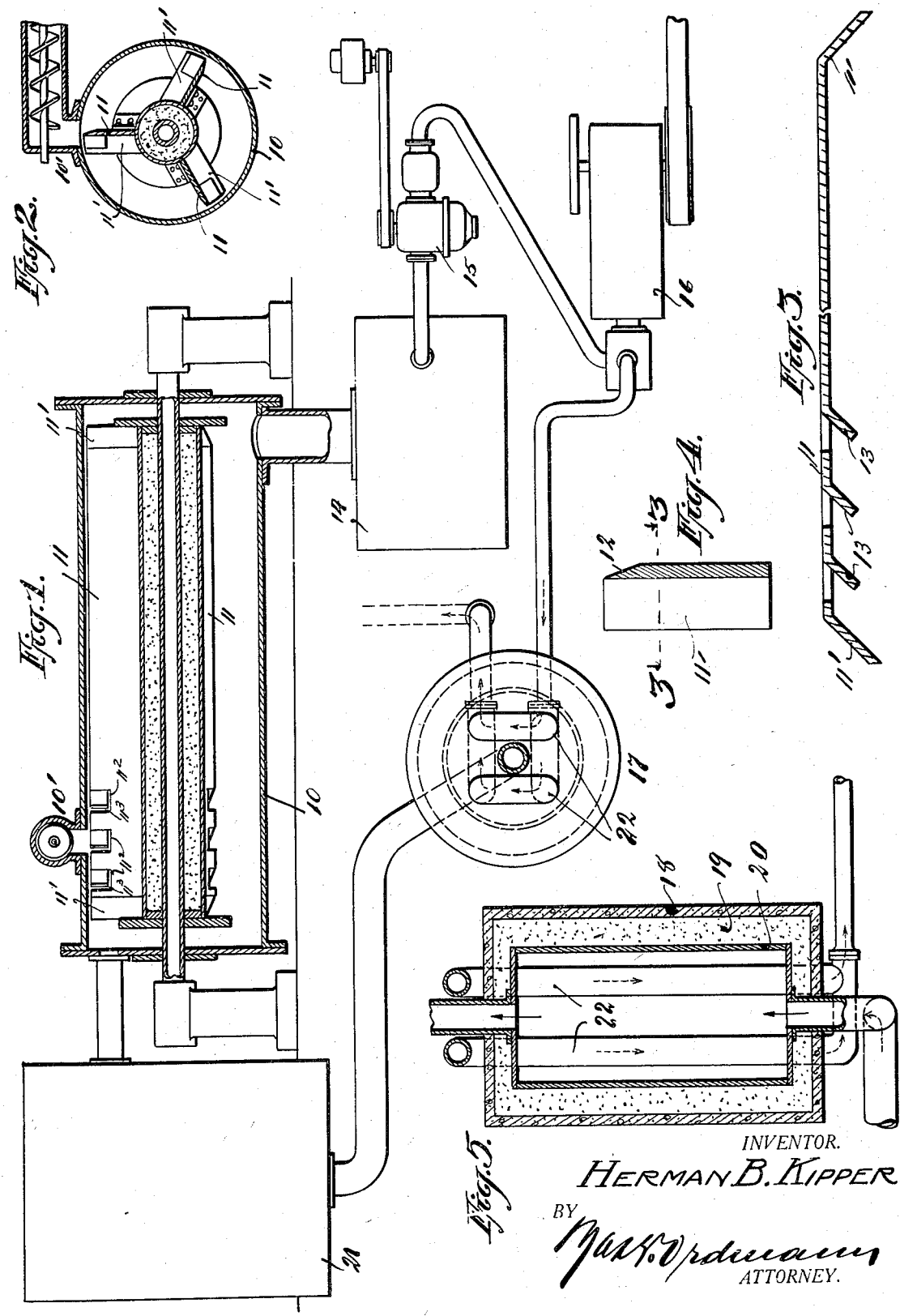

1,512,226

UNITED STATES PATENT OFFICE.

HERMAN B. KIPPER, OF MUSKEGON, MICHIGAN.

PROCESS OF MAKING HYDROCHLORIC ACID AND SODIUM SULPHATE.

Application filed October 24, 1922. Serial No. 596,545.

*To all whom it may concern:*

Be it known that I, HERMAN B. KIPPER, a citizen of the United States of America, residing at Muskegon, in the county of Muskegon and State of Michigan, have invented certain new and useful Improvements in Processes of Making Hydrochloric Acid and Sodium Sulphate, of which the following is a specification.

The present invention has for its object to provide a process of effectively speeding the reactions occuring between sulphuric acid and sodium chloride or between the latter and hydrogen sodium sulphate, so as to produce aqueous hydrochloric acid, and converting the latter into chlorine or utilizing it otherwise.

The reactions in the two cases are practically identical since in the reaction between sodium chloride and hydrogen sodium sulphate it is the sulphuric acid content or radical that reacts with the sodium chloride, the only difference being that in the latter case the reaction is only half completed.

The hydrochloric acid and other gases after their separation from sodium sulphate and other dusts can be converted into chlorine simultaneously with the formation of water by passing it under pressure over catalytic materials and at a temperature suitable for carrying out the reactions in operation.

The reactions occur as follows:—

1. $H_2SO_4 + 2NaCl = Na_2SO_4 + 2HCl$.
2. $NaHSO_4 + NaCl = Na_2SO_4 + HCl$.
3. $2HCl + O_2 = Cl_2 + H_2O$.

In order to increase the speed of the above reactions I subject the reaction substances to blows or impacts of rapidly revolving hammers during the period of reaction.

My process as carried out by the apparatus forming part of this invention will be more fully undersood by reference to the accompanying drawing in which similar reference characters denote corresponding parts and in which Fig. 1 is a sectional elevation of the apparatus shown more or less diagrammatically; Fig. 2 is a cross section of the reaction cylinder; Fig. 3 is a longitudinal section of one of the hammers on line 3—3 of Fig. 4; Fig. 4 a cross section thereof, and Fig. 5 a central longitudinal section of the converter.

The sulphuric acid and salt or ground nitre cake and salt are fed in well known manner into the reaction cylinder 10 at 10'. The cylinder may be externally or internally heated to a temperature of 200° to 800° C. The optimum temperature of operation is about 400° C. In the reaction cylinder the substances are subjected to the blows of rotary hammers 11, which I preferably make in form of longitudinally extending and radially projecting flat bars arranged at 120° apart. The outer edges 12 of said hammers are bevelled down so as to reduce any frictional resistance that may occur between the wall of the cylinder and the revolving hammers. The ends 11' of these flat bars are bent at a suitable angle, say, about 45°, whereby the reaction materials entering the cylinder 10 are prevented from caking at the feeding and discharge ends of the cylinder. Each of the flat bars have at their end portions near the inlet 10' several angular incisions, as at $11^2$, $11^3$, to form parts 13 which are bent at an angle of about 45° relative to the body portion and which form baffle members serving to drive the entering materials forward and away from the inlet, thereby keeping the latter clear.

The hydrochloric acid formed is then separated from sodium sulphate and other dusts in a dust chamber 14, and converted into chlorine or otherwise utilized in the manner hereinafter described.

In the manufacture of chlorine by the so-called Deacon process, a mixture of hydrochloric acid gas and oxygen (air) is passed over copper chloride. The latter acts as a catalytic agent, and, in order to carry out the reaction between the gases mentioned, is deposited on a porous material, such as brick broken into small pieces. The reaction is carried out at 400° to 500° C. and at atmospheric pressure and is as follows:—

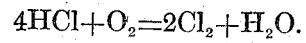

$$4HCl + O_2 = 2Cl_2 + H_2O.$$

As, however, the reaction is a reversible one complete decomposition of the hydrochloric acid gas does not take place, and a considerable portion passes the catalyst in an unaltered state. This fact has been largely instrumental in preventing the very extensive commercial use of the process.

I have found, however, that if the reaction is carried out at a considerably increased pressure, for instance, at from 100 to 150 pounds pressure, a far more complete decomposition of the hydrochloric acid gas occurs and a correspondingly increased percentage of chlorine is secured. Moreover, the efficiency of the catalytic reaction surface is increased somewhat proportionately with the increase in pressure.

The hydrochloric acid gas, mixed with air, or oxygen, is passed from the chamber 14 through a scrubber 15 where it is washed with sulphuric acid to free it of any dust (sodium sulphate, etc.) and moisture. It is then compressed in a compressor 16 to a pressure of from 100 to 500 pounds (higher pressure may of course be used) and passed through a converter 17 containing the catalytic material. This converter consists of an outer concrete shell 18, insulating material 19, an inner cast iron shell 20 through which pass the heating gases from the furnace 21, and pipes 22 extending therethrough and containing the catalytic material, such as copper chloride or other suitable catalysts.

The chlorine formed is then scrubbed in another scrubber (not shown) to free it of any volatilized copper chloride and undecomposed hydrochloric acid gas and is then led to lime absorption towers (not shown).

I have found that the same mixture consisting of chlorine, air, hydrochloric and carbonic acid gases and moisture may be effectively used for direct bleaching of paper pulp. The compressed gaseous mixture, as it leaves the converter 16, may be passed through the pulp contained in a slowly revolving lead lined cylinder at a temperature of 15° to 150° C. Pressures as high as 150 pounds per square inch may be employed, although it would appear that even higher pressure might be advantageously used.

What I claim is:—

1. In the process which involves the reaction between sulphuric acid and sodium chloride and the simultaneous grinding of the sodium chloride and of the sodium hydrogen sulphate and sodium sulphate formed by means of rapidly moving hammers or metal bars, the step of heating said materials to from 200° to 800° C. to produce sodium sulphate and hydrochloric acid gas.

2. In the process which involves the reaction between sulphuric acid and sodium chloride and the simultaneous grinding of sodium chloride and sodium hydrogen sulphate and the sodium sulphate formed by means of rapidly moving hammers or metal bars, the step of heating said materials to from 200° to 800° C. to produce sodium sulphate and hydrochloric acid gas.

In testimony whereof I affix my signature in presence of two witnesses.

HERMAN B. KIPPER.

Witnesses:
FLOYD W. EGGLESTON,
THOS. E. WEST.